USOO5751543A

United States Patent [19]
Gehrs et al.

[11] Patent Number: 5,751,543
[45] Date of Patent: May 12, 1998

[54] SEALING COVER ASSEMBLY FOR ELECTRICAL BUS CONNECTIONS

[75] Inventors: Donald F. Gehrs; Robert E. Craddock, both of Brandon, Miss.

[73] Assignee: Eaton Corporation, Cleveland, Ohio

[21] Appl. No.: 283,015

[22] Filed: Jul. 29, 1994

[51] Int. Cl.$^6$ .................................................. H02B 1/26
[52] U.S. Cl. ........................ 361/641; 174/66; 361/627; 361/644
[58] Field of Search ...................... 174/66, 67; 361/615, 361/616, 617, 624, 627, 644, 645, 648, 653, 654, 659, 660, 641, 667, 622, 623; 200/50 AA

[56] References Cited

U.S. PATENT DOCUMENTS

| | | | |
|---|---|---|---|
| 1,269,770 | 6/1918 | Wurdack | 361/644 |
| 1,685,462 | 9/1928 | Palmer et al. | 361/641 X |
| 1,884,000 | 10/1932 | Lewis | 361/641 X |
| 3,479,104 | 11/1969 | Kobryner | 361/659 |

Primary Examiner—Hyung S. Sough
Attorney, Agent, or Firm—Martin J. Moran

[57] ABSTRACT

A slidable sealing cover assembly for unmetered electrical horizontal bus connections arranged in a customer compartment adjacent to a utility compartment for a panel board arrangement. The sealing cover assembly employs a cover member and a slide member attached to each end of the cover member. The cover assembly is slidably mounted on an existing fixed bus housing for the bus connections. A slotted end of each slide member extends into the utility compartment, and a slidable latching mechanism mounted on a wall of the utility compartment engages the slotted end of each slide member. When the cover member is positioned over the bus connections in the customer compartment, the slidable latching mechanisms are operated to enter the slot on the slotted end of each slide member so that the hinged door to the utility compartment can be closed. However, if the cover member is slidably disposed for access to the bus connections in the customer compartment, the slide members attached to the cover member extend further into the utility compartment to create an interference with the slidable latching mechanisms such that the latching mechanisms extend out of the utility compartment, whereby the door to the utility compartment cannot be closed.

2 Claims, 6 Drawing Sheets

SEALING COVER ASSEMBLY FOR ELECTRICAL BUS CONNECTIONS

BACKGROUND OF THE INVENTION

1. Field of the Invention

The invention relates to a sealing cover assembly for unmetered electrical bus connections in an open compartment and, more particularly, to a slidable sealing cover assembly which includes a latching mechanism which when operated can resist the closing of a door or cover for an adjacent panel board compartment.

2. Description of the Prior Art

Present-day equipment used by utility companies for supplying, for instance, electricity to a commercial user or customer may involve an electrical panel board that consists of two compartments, a utility compartment and a customer compartment. The utility compartment is usually not accessible to customers.

Generally, in the customer compartment there is a section in which incoming unmetered power connections are made. After initial power connections are made, this section must be sealed from customer access. Sealing means is done in the form of a removable sealing cover assembly.

The present-day removable sealing cover assembly is retained in the customer compartment and employs a slidable one-piece locking latch that extends into the utility compartment and can be accessed only by utility personnel. The sealing cover is a fabricated sheet metal cover which covers the horizontal bus connections and is retained by a fabricated sliding latch which slides into the sealing cover, preventing removal of the sealing cover and is located in the utility section of the panel board.

This construction for a sealing cover assembly for bus connections located in a customer compartment and its locking latch feature may seem to indicate that access must be made to the utility compartment for removal of the sealing cover assembly in the customer compartment. However, this present design for a sealing cover assembly does not assure the utility company that the sealing cover assembly is actually mounted over the bus connections when the door to the utility compartment is closed. The sealing cover assembly may in fact be omitted when the horizontal bus connections are made without the utility personnel's knowledge and still have the locking latch in the utility compartment moved into a locking position thereby giving the impression that the horizontal bus compartment has been sealed. A visual inspection of the bus compartment has to be made in order to assure the utility personnel that the bus connection compartment has actually been sealed.

There remains, therefore, a need for a means for preventing the closing of the door to the utility compartment when the sealing cover assembly has not been or has improperly been positioned over the bus connections in the adjacent customer compartment.

There also remains a need for a sealing cover assembly which positively seals the bus connection compartment when the utility compartment door is closed without requiring visual inspection by utility personnel.

SUMMARY OF THE INVENTION

The present invention has met the above-described needs. The present invention involves a slidable sealing cover assembly for sealing bus connections in a customer compartment and an associated slidable latching mechanism in an adjacent utility compartment for locking and unlocking the sealing cover assembly, and which latching mechanism when in an unlocked condition prevents the door to the utility compartment from being fully closed and thereafter locked.

The slidable sealing cover assembly is comprised of spaced-apart sliders and a cover member mounted on the sliders. Each of the sliders has a hooked end portion which extends through the wall of the utility compartment, and longitudinal slots along its body. The entire sealing cover assembly is slidably mounted on an existing fixed frame for the bus connections, preferably, by way of pins in the walls of the fixed frame which engage the slots along the body of the sliders. The slidable latching mechanism is mounted along the wall of the utility compartment for engagement with the hooked end portion of the slider. The length of the latching mechanism is such that if the sealing cover assembly is properly positioned over the bus connections, the latching mechanism will positively engage the hooked end of the slider and the door to the utility compartment can be fully closed. However, if the cover assembly is not properly positioned, the hooked end portion of the slider will be out of alignment with the slidable latching mechanism, the result being that the latching mechanism will remain extending out of the utility compartment thereby preventing the door from being fully closed.

Accordingly, it is an object of the present invention to provide a sealing cover assembly which is not easily removable from the customer compartment.

It is a further object of the present invention to provide a slidable sealing cover assembly for bus connections in a customer compartment which is permanently attached to an existing bus cover in the customer compartment.

It is a further object of the present invention to provide a slidable sealing cover assembly which when in an open position prevents closing of the door to the utility compartment, and when in a closed position allows the door to the utility compartment to be closed, the latter condition allowing the sealing of the utility compartment and the sealing of the bus connections in the customer compartment.

These and other objects of the present invention will be more fully understood and appreciated from the following description of the invention on reference to the illustrations appended hereto.

DESCRIPTION OF THE PREFERRED EMBODIMENT

Generally, the present invention is used to seal in unmetered horizontal bus connections so that a customer cannot make electrical connections without paying for the electricity.

Figure 1:
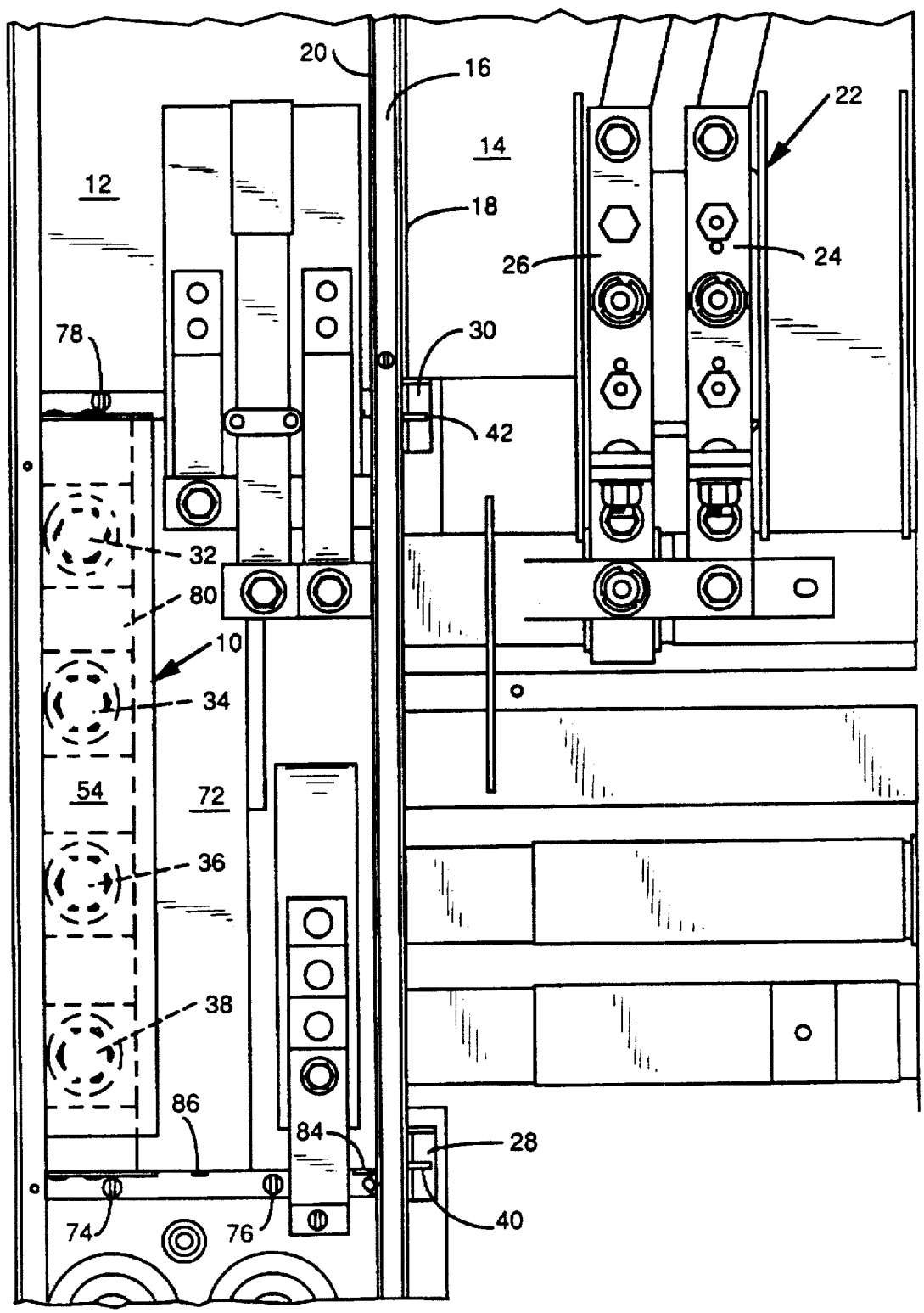
FIG. 1 is a partial broken away elevational view illustrating the sealing cover assembly of the present invention in a closed positioning and installed in a customer compartment with opposed slidable latching mechanisms of the invention being engaged with hooked end portions of the cover assembly extending into the utility compartment in a panel board.
Figure 2:
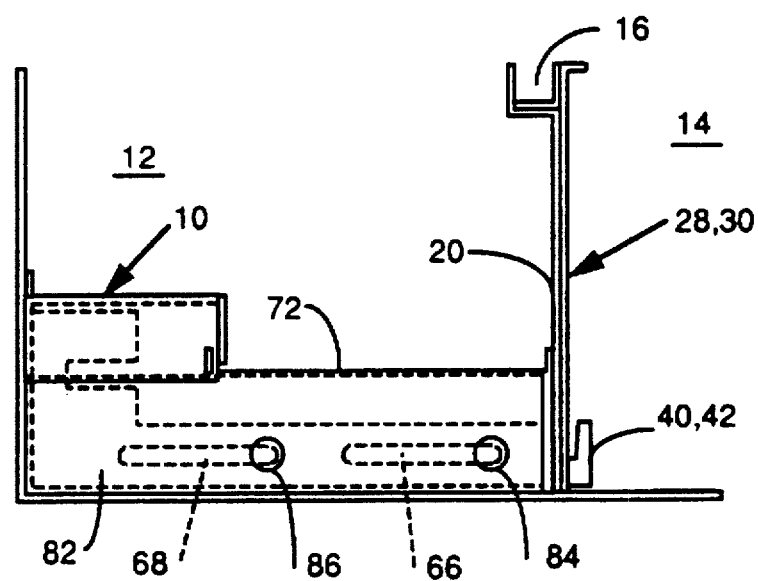
FIG. 2 is an end view schematically showing the closed positioning of the sealing cover assembly of FIG. 1, with some of the components of the customer compartment removed for clarity.

Referring first to FIGS. 1 and 2, there is shown a sealing cover assembly generally indicated at 10 in a closed positioning and being installed in a customer compartment 12. Particularly referring to FIG. 1, adjacent to customer compartment 12 is a utility compartment 14 which normally is fully enclosed by a hinged door (not shown in FIGS. 1 and 2) which is received in channels around compartment 14 such as that channel shown at numeral 16 formed by walls 18 and 20 between compartments 12 and 14, more about which will be discussed hereinbelow.

Still referring to FIG. 1, compartment 14 contains a panel board, generally indicated at 22, having bus connections 24 and 26 which supply electricity from the outside to the inside of a building. Generally, access to compartment 14 is only possible by the personnel of the electricity company for their use in connecting the panel board with the metered bus connections for electrical consumption by the user or customer. In referring to FIGS. 1 and 2, there is shown the manner in which slidable latching mechanisms 28 and 30 engage the sealing cover assembly 10 when the sealing cover assembly 10 is in the closed positioning as illustrated in these FIGS. 1 and 2.

Figure 4:
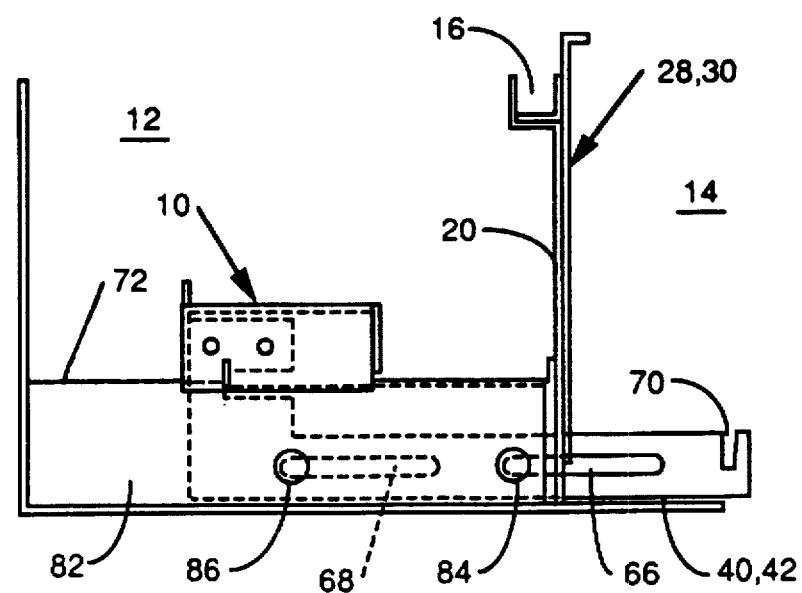
FIG. 4 is an end view schematically showing the sealing cover assembly in the open positioning of FIG. 3, with some of the components of the customer compartment removed for clarity.
Figure 3:
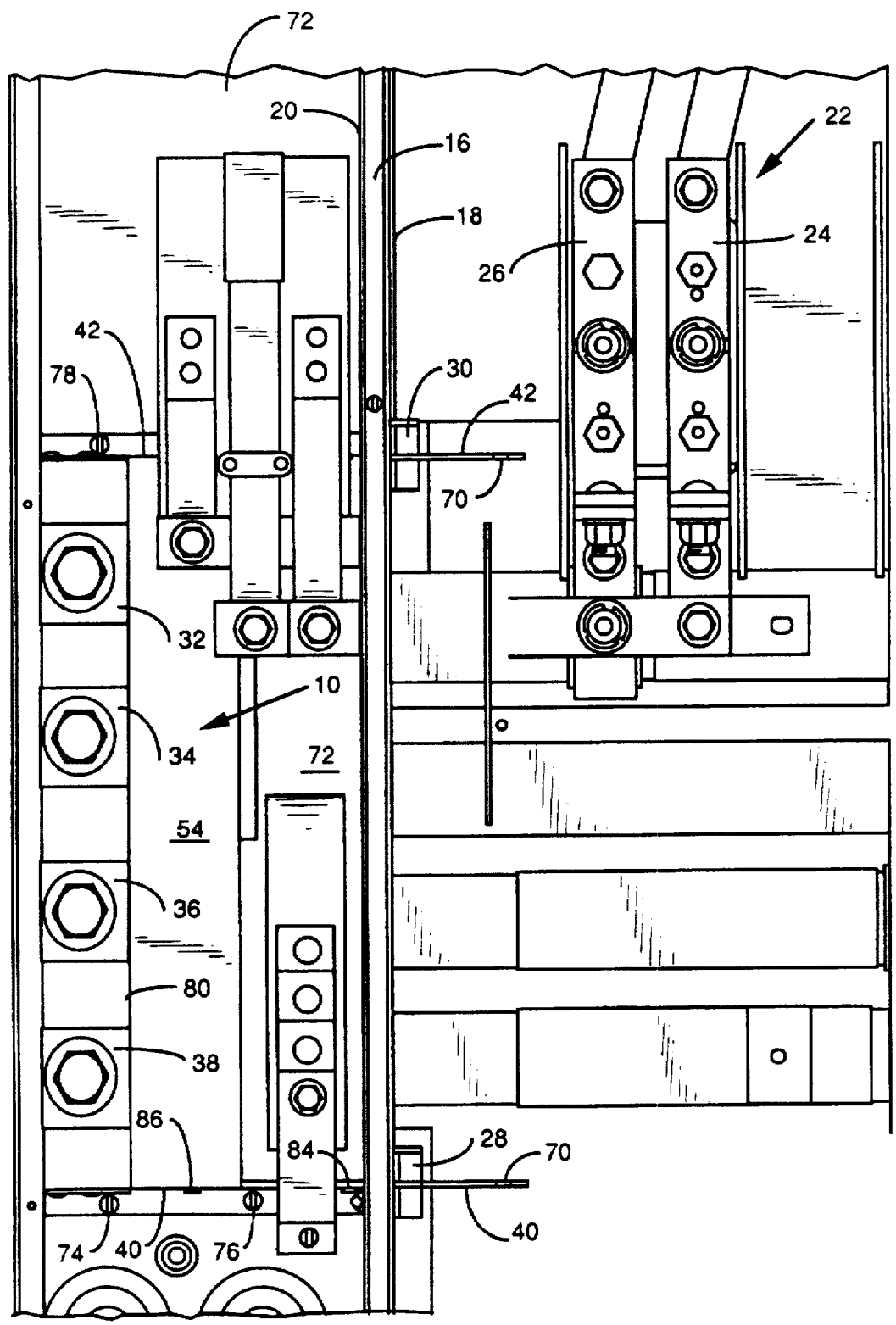
FIG. 3 is a partial broken away elevational view illustrating the sealing cover assembly of the present invention in an open positioning which provides access to several bus connections with the slidable latching mechanisms of the invention being disengaged from the hooked end portions of the cover assembly and the hooked end portions extending into the utility compartment.

FIGS. 3 and 4 illustrate sealing cover assembly 10 in its open positioning with FIG. 3 particularly disclosing several horizontal bus connections 32, 34, 36, and 38 which generally are unmetered and which supply power to the panel board from the utility compartment 14, and which bus connections 32, 34, 36 and 38 are only for use by the utility company's personnel. FIG. 4 shows slidable latching mechanisms 28 and 30 as being disengaged from the portions of sealing cover assembly extending into utility compartment 14 and that such disengagement causes latching mechanisms 28 and 30 to extend out of compartment 14.

Figure 5:
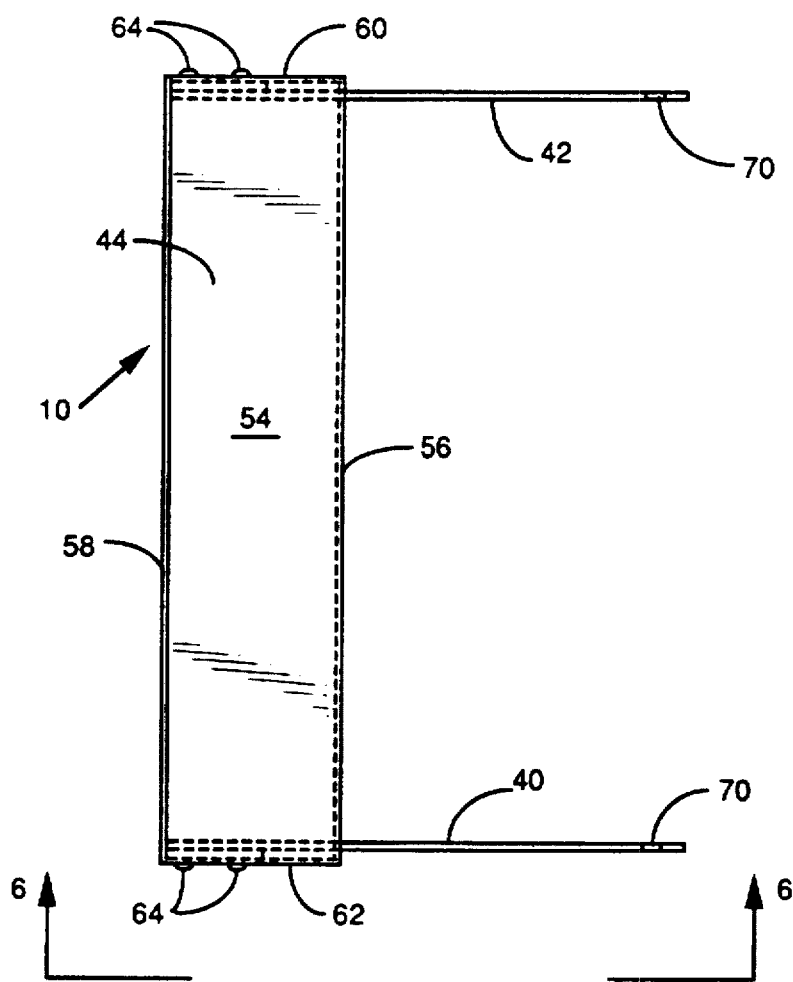
FIG. 5 is an elevational view illustrating the sealing cover assembly of the present invention prior to it being installed into the customer compartment of the panel board.

The construction of sealing cover assembly 10 will now be given with particular reference to FIGS. 5 and 6. Sealing cover assembly 10 is comprised essentially of spaced-apart slide members 40 and 42 and cover member 44, whose width is substantially less than the length of slide members 40 and 42.

Preferably, cover member 44 is an integral one-piece member, and slide members 40 and 42 are integral one-piece members. Preferably, cover member 44 and slide members 40 and 42 are stamped out of sheet metal and then formed or bent into shape. Members 40, 42, and 44 of cover assembly 10 can also be fabricated by a plastic molding process.

Figure 6:
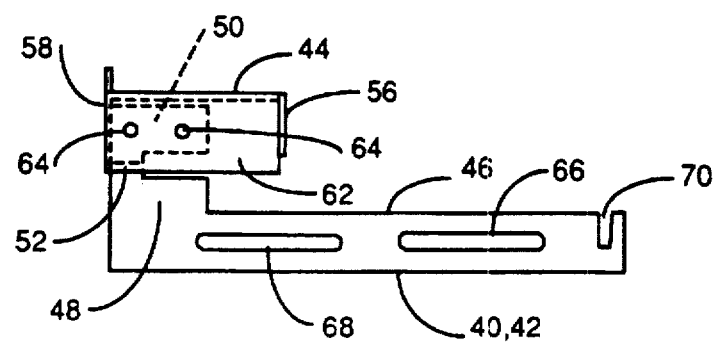
FIG. 6 is an end view taken along lines 6—6 of FIG. 5.

As shown in FIG. 6, each slide member 40,42 has an elongated body 46, a stepped portion 48, and a top portion 50. Between top portion 50 and stepped portion 48 is a transition portion 52 which when viewing FIG. 6 is bent slightly into the plane of this FIG. 6 so that top portion 50 is in a parallel plane behind the plane in which stepped portion 48 extends. Preferably, cover member 44 is formed into a rectangular configuration with a top surface 54, sidewalls 56 and 58, and end walls 60 and 62, as indicated in FIG. 5.

In assembly sealing cover assembly 10, cover member 44 is positioned between slide members 40,42 and placed over top portion 50 of each slide member 40,42. Cover member 44 is attached to top portion 50 of slide members 40 and 42 by fastening means, such as rivets shown at 64 in FIGS. 5 and 6. The indentation of top portion 50 of slide members 40,42 allows end walls 60 and 62 of cover member 44 to be almost flush with and in the plane of elongated body 46 of slide members 40,42. This construction of cover assembly 10 allows the horizontal bus connections 32,34,36, and 38 to be completely covered when cover assembly 10 is installed in compartment 12, in the manner shown particularly in FIGS. 1 and 2.

Referring again to FIG. 6, each slide member 40,42 has elongated, longitudinal slots 66 and 68 formed in its elongated body 46, and an open transverse slot 70 which forms a hooked-end portion for each slide member 40,42.

When installed into customer compartment 12, sealing cover assembly 10 is slidably mounted onto an existing frame housing 72 shown in FIGS. 1–4. Frame housing 72 essentially extends the width of customer compartment 12, is permanently mounted in customer compartment 12 by fastening means, such as screws, indicated at numbers 74,76, and 78, in FIGS. 1 and 3, and has an opening 80 through which bus connections 32,34,36 and 38 extend.

Sealing cover assembly 10 is slidably mounted onto existing bus housing 72 by placing cover 10 onto bus housing 72 with slide members 40,42 being placed outwardly against the inside surface of the end walls of bus housing 72, one of which end wall is indicated at 82 in FIGS. 2 and 4. Sealing cover assembly 10 is then affixed to housing 72 for sliding movement thereon by inserting rivets, indicated at numerals 84 and 86, through elongated slots 66 and 68 of elongated body 46 of slide members 40,42 and into each end wall 82 of permanent bus housing 72.

When sealing cover assembly 10 is mounted onto bus housing 72, the hooked end having an open slot 70 of each slide member 40,42 is caused to be received in an opening (not shown) in compartment walls 18 and 20 in a manner that each hooked-end extends into utility compartment 14, shown best in FIGS. 1 through 4.

When sealing cover assembly 10 is in its closed positioning of FIGS. 1 and 2, the open slot 70 of each slide member 40,42 is engaged by its respective slidable latching mechanism 28,30, as particularly shown in FIGS. 1 and 3.

Figure 7:
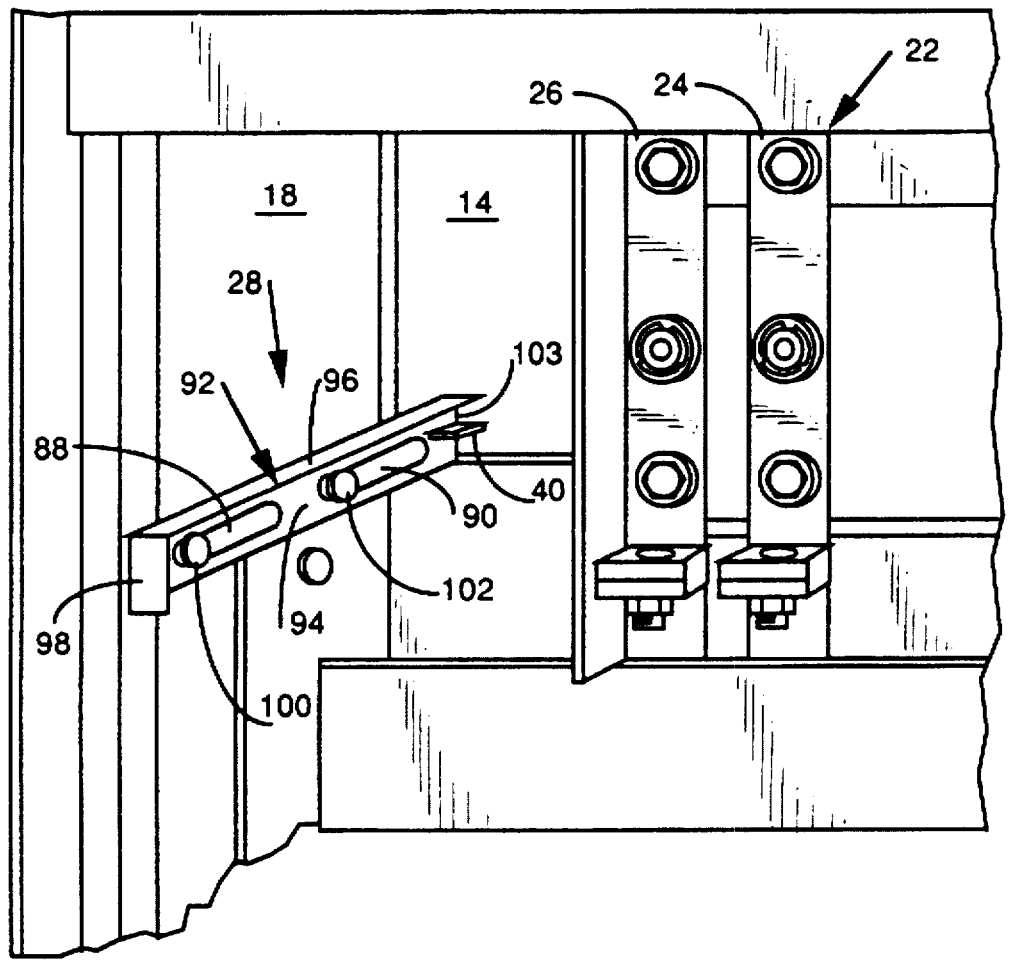
FIG. 7 is a partial broken away perspective view illustrating more clearly one of the slidable latching mechanisms in engagement with its respective hooked end of the cover assembly when the sealing cover assembly is in its closed positioning of FIG. 1.

The construction of these slidable latching mechanisms 28 and 30 is shown with reference to FIG. 7, which only shows mechanism 28 for slide member 40, but which also applies to slidable latching mechanism 30 for slide member 42.

Referring to FIG. 7, each latching mechanism 28,30 is slidably attached to compartment wall 18 of enclosed compartment 14, and essentially consists of an L-shaped bracket 92 consisting of elongated members 94 and 96 and an end portion 98. The length of L-shaped bracket 92 is essentially equal to the depth of compartment 14. Member 94 of L-shaped bracket 92 has elongated slots 88 and 90 into which rivets 100 and 102, respectively, are inserted for the mounting of L-shaped bracket 92 onto wall 18.

As particularly shown in this FIG. 7, the extreme end portion 103 of member 94, which may also have a slot, is received into and interlocks with slot 70 of the end portion of slide members 40,42 when sealing cover assembly 10 is in its closed position of FIGS. 1 and 2.

From the above, it becomes apparent that in order for sealing cover assembly 10 to be disposed in its open positioning of FIGS. 3 and 4, that each latching mechanism 28,30 must be operated so that its member 94 is disengaged from slot 70 of its respective slide member 40,42. This is accomplished by sliding L-shaped bracket 92 along compartment wall 18 so that end portion 98 of each latching mechanism 28,30 extends or protrudes beyond wall 18. Sealing cover assembly 10 is moved to the right with respect to FIGS. 1–4 so that slide members 40,42 extend into compartment 14 as shown in FIGS. 3 and 4.

Figure 8:
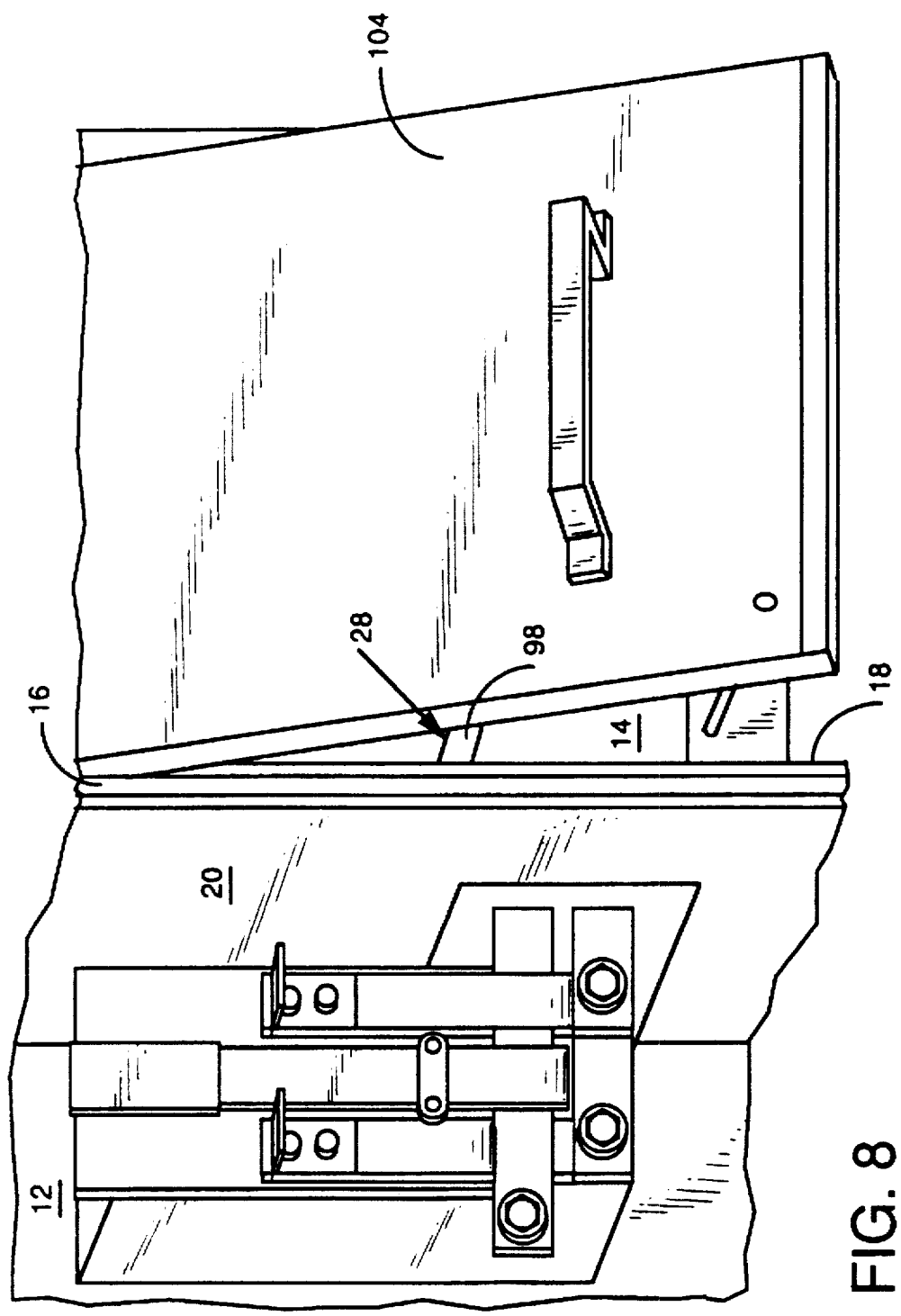
FIG. 8 is a partial broken away perspective view illustrating one of the slidable latching mechanisms of the present invention extending out of the utility compartment when it is not in engagement with its respective hooked end of the sealing cover assembly of the invention.

When one or both of latching mechanisms 28 and 30 are protruding out of utility compartment 14, the result is that as shown in FIG. 8 for latching mechanism 28 whereby hinged door 104 for utility compartment 14 cannot be fully closed and utility compartment 14 cannot be sealed before panel board 22 is energized.

Sealing cover assembly 10 cannot be easily removed from customer compartment 12 and, it can only be slid into an open or a closed positioning relative to bus connections 32–38 of FIGS. 1 and 3. In a closed positioning, latching mechanisms 28 and 30 are engaged in open transverse slot 70 of slide members 40,42 with latching mechanisms 28 and 30 being flushed with wall 18 as particularly shown in FIGS. 1, 2 and 7. In an open positioning, latching mechanisms 28 and 30 are out of engagement with open slot 70 of slide members 40,42 and latching mechanisms 28 and 30 are protruding beyond wall 18 as shown in FIGS. 3, 4, and 8.

The closed positioning of sealing cover assembly 10 and the positioning of latching mechanisms 28 and 30 of FIGS. 1, 2, and 7 allow hinged door 104 of utility compartment 14 to enter channel 16 between compartments 12 and 14 to seal utility compartment 14 prior to energizing panel board 22, whereas the open positioning of sealing cover assembly 10 and the positioning of latching mechanisms 28 and 30 of FIGS. 3, 4, and 8 prevent the closing of hinged door 104, thereby warning or making the utility personnel aware of the situation so that proper steps can be taken to close the sealing cover assembly 10 before the panel board 22 is energized. This sealing cover assembly 10 allows the utility company a positive means of sealing the horizontal bus connections 32,34,36 and 38 in customer compartment 12 without visual inspection of the sealing cover assembly 10.

Whereas, particular embodiments of the invention have been described above for purposes of illustration, it will be appreciated by those skilled in the art that numerous variations of the details may be made without departing from the invention as described in the appended claims.

In accordance with the provisions of the patent statutes, we have explained the principles and operation of our invention and have illustrated and described what we consider to be the best embodiments thereof.

We claim:

1. In combination with a panel board arrangement in a utility compartment and electrical bus connection means in a customer compartment adjacent to said utility compartment, and including fixed bus housing means for said electrical bus connection means, a sealing cover assembly for said electrical bus connection means, comprising:

slidable base means mounted on said fixed bus housing means of said electrical bus connection means and having an end portion extending into said utility compartment;

cover means fixedly mounted to said slidable base means for slidable movement therewith and for covering said electrical bus connection means when said sealing cover assembly is in a closed positioning in said customer compartment;

operative means associated with said end portion of said slidable base means extending into said utility compartment for said panel board arrangement for resisting movement of said slidable base means in order to establish said closed positioning of said sealing cover assembly and for allowing movement of said slidable base means for an open positioning of said sealing cover assembly to allow access to said electrical bus connection means;

wherein said utility compartment has a wall and a door, and wherein said operative means is comprised of slidable latching means mounted to said wall of said utility compartment and engagable with said slidable base means; and wherein said slidable latching means includes means for resisting the closing of said door of said utility compartment when said slidable latching means is in disengagement with said slidable base means, and for allowing said closing of said door of said utility compartment when said slidable latching means is in engagement with said slidable base means.

2. The combination of claim 1, wherein said utility compartment has a depth, wherein said slidable latching means is mounted in said utility compartment, and wherein said slidable latching mechanism has a length which is equal to or less than the dimension of said depth of said utility compartment.

* * * * *